(12) United States Patent
Nomura et al.

(10) Patent No.: US 7,791,746 B2
(45) Date of Patent: Sep. 7, 2010

(54) IMAGE FORMING SYSTEM AND IMAGE PROCESSING SYSTEM WHICH RESTRICTS OUTPUT BASED ON JUDGED ATTRIBUTES OF IMAGE DATA

(75) Inventors: Tatsuo Nomura, Kyoto (JP); Syoichiro Yoshiura, Nara (JP); Tsutomu Yoshimoto, Yamatotakada (JP)

(73) Assignee: Sharp Kabushiki Kaisha, Osaka (JP)

( * ) Notice: Subject to any disclaimer, the term of this patent is extended or adjusted under 35 U.S.C. 154(b) by 2122 days.

(21) Appl. No.: 09/969,845

(22) Filed: Oct. 4, 2001

(65) Prior Publication Data
US 2002/0059318 A1 May 16, 2002

(30) Foreign Application Priority Data
Oct. 10, 2000 (JP) ............................. 2000-309661
Jul. 25, 2001 (JP) ............................. 2001-225124

(51) Int. Cl.
G06F 12/00 (2006.01)

(52) U.S. Cl. .................... 358/1.14; 358/1.15; 358/1.16; 399/80; 399/366

(58) Field of Classification Search ........ 358/1.14–1.16; 399/366, 367, 234, 80; 707/200; 382/135, 382/137, 181, 165, 162, 168
See application file for complete search history.

(56) References Cited

U.S. PATENT DOCUMENTS

| | | | | |
|---|---|---|---|---|
| 5,694,222 A * | 12/1997 | Yamada | ...................... | 358/296 |
| 5,754,744 A * | 5/1998 | Matsumoto et al. | ......... | 358/1.13 |
| 5,861,960 A * | 1/1999 | Suzuki et al. | ............... | 382/239 |
| 6,163,383 A * | 12/2000 | Ota et al. | ..................... | 358/1.1 |
| 6,807,388 B1 * | 10/2004 | Kojima et al. | ................. | 399/80 |
| 7,103,581 B1 * | 9/2006 | Suen et al. | .................. | 705/400 |
| 2005/0219605 A1 * | 10/2005 | Sato | .......................... | 358/1.14 |
| 2005/0225793 A1 * | 10/2005 | Namikata | .................. | 358/1.14 |

FOREIGN PATENT DOCUMENTS

| | | |
|---|---|---|
| JP | 03-191666 | 8/1991 |
| JP | 6-50901 B2 | 6/1994 |
| JP | 7-23218 A | 1/1995 |
| JP | 7-49645 A | 2/1995 |

(Continued)

OTHER PUBLICATIONS

JP Office Action and translation thereof mailed Sep. 6, 2005 in corresponding JP application No. 2001-225124.

*Primary Examiner*—David K Moore
*Assistant Examiner*—Peter K Huntsinger
(74) *Attorney, Agent, or Firm*—Nixon & Vanderhye P.C.

(57) ABSTRACT

An image forming system includes an image forming device which forms an image based on image data, and an image processing device such as a personal computer, and the image forming system is capable of restricting image output of the image forming device. In the image forming system, data information of the output image data or working environment of the image forming device is judged, so as to allow or disallow image output based on the working environment so judged. This judges whether or not devices such as digital complex device or scanner device in the image forming system are used properly, thus providing an image processing system which can be used efficiently.

28 Claims, 13 Drawing Sheets

PRINT DATA FORMAT LIST

| MANAGEMENT CODE | DATA TO BE FORMED | PRINT JOB | RESTRICTION |
|---|---|---|---|
| Data-1 | BLACK-AND-WHITE DATA (COLOR AREA 0%) | ○ | |
| Data-2 | DATA WITH COLOR AREA NOT MORE THAN 30% | ○ | |
| Data-3 | DATA WITH COLOR AREA NOT MORE THAN 50% | ○ | |
| Data-4 | DATA WITH COLOR AREA NOT MORE THAN 80% | | ○ |
| Data-5 | DATA WITH COLOR AREA NOT LESS THAN 80% | | ○ |
| Data-6 | HTML DATA | | ○ |

FOREIGN PATENT DOCUMENTS

| | | |
|---|---|---|
| JP | 9-288552 A | 11/1997 |
| JP | 10-161823 A | 6/1998 |
| JP | 11-134136 A | 5/1999 |
| JP | 11-157179 A | 6/1999 |
| JP | 2000-47534 A | 2/2000 |
| JP | 2000-318273 A | 11/2000 |
| JP | 2001-096842 | 4/2001 |
| JP | 2001-188663 A | 7/2001 |

* cited by examiner

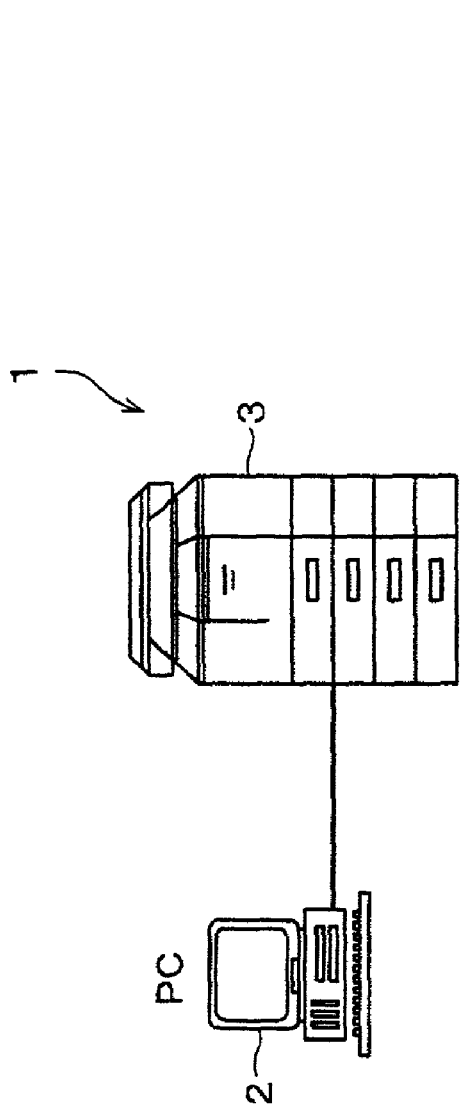
F I G. 1 (a)
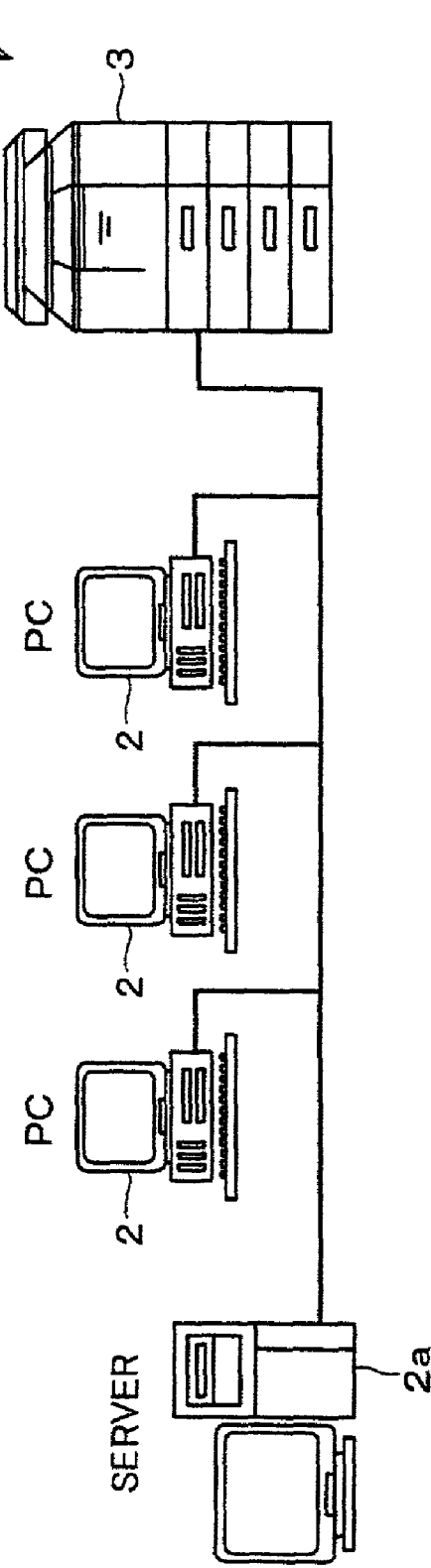
F I G. 1 (b)

FIG. 3

PRINT DATA FORMAT LIST

| MANAGEMENT CODE | DATA TO BE FORMED | PRINT JOB | RESTRICTION |
|---|---|---|---|
| Data-1 | BLACK-AND-WHITE DATA (COLOR AREA 0%) | ○ | |
| Data-2 | DATA WITH COLOR AREA NOT MORE THAN 30% | ○ | |
| Data-3 | DATA WITH COLOR AREA NOT MORE THAN 50% | ○ | |
| Data-4 | DATA WITH COLOR AREA NOT MORE THAN 80% | | ○ |
| Data-5 | DATA WITH COLOR AREA NOT LESS THAN 80% | | ○ |
| Data-6 | HTML DATA | | ○ |

F I G. 4

PRINT APPLICATION LIST

| MANAGEMENT CODE | APPLICATION | PRINT JOB | RESTRICTION |
|---|---|---|---|
| Appli-1 | WORD PROCESSOR SOFTWARE | ○ | |
| Appli-2 | SPREAD SHEET SOFTWARE | ○ | |
| Appli-3 | GRAPHIC SOFTWARE | ○ | |
| Appli-4 | MAIL SOFTWARE | | ○ |
| Appli-5 | BROWSER SOFTWARE | | ○ |
| Appli-6 | CAD SOFTWARE | ○ | |
| | | | |
| | | | |
| | | | |
| | | | |
| | | | |
| | | | |
| | | | |

FIG. 7

| | USER | TIME OF INSTRUCTION | NUMBER OF COPIES | SHEET SIZE |
|---|---|---|---|---|
| 001 | YAMADA | 11:42 | 10 | A4 |
| 002 | SUZUKI | 13:11 | 1 | A3 |
| 003 | KINOSHITA | 13:11 | 1 | A4 |

OUTPUT
CLEAR
SAMPLE OUTPUT
ALL OUTPUT

FIG. 8

CAUTION
001 USER: YAMADA
PRINT DATA NOT ALLOWABLE
OK

OUTPUT
CLEAR
SAMPLE OUTPUT
ALL OUTPUT

FIG. 9

CAUTION
001 USER: YAMADA
PRINT DATA NOT ALLOWABLE
DATA WILL BE KEPT IN RECORD
OK

OUTPUT
CLEAR
SAMPLE OUTPUT
ALL OUTPUT

F I G. 1 0

HISTORY OF NON-ALLOWABLE PRINT DATA

| DATE AND TIME | USER NAME | CONTENT OF DETECTION | NUMBER OF COPIES |
|---|---|---|---|
| 2000.04.17 09:21 | YAMADA | DATA WITH COLOR AREA NOT LESS THAN 80% | 10 |
| 2000.04.11 15:45 | SATO | MAIL SOFTWARE | 3 |
| 2000.04.10 12:15 | TANAKA | OUTPUT OUTSIDE OF ALLOWABLE TIME PERIOD | 4 |
| 2000.04.10 09:33 | SUZUKI | DATA WITH COLOR AREA NOT LESS THAN 80% | 11 |
| 2000.04.09 14:56 | UEDA | BROWSER SOFTWARE | 5 |
| ⋮ | ⋮ | ⋮ | ⋮ |

F I G. 15
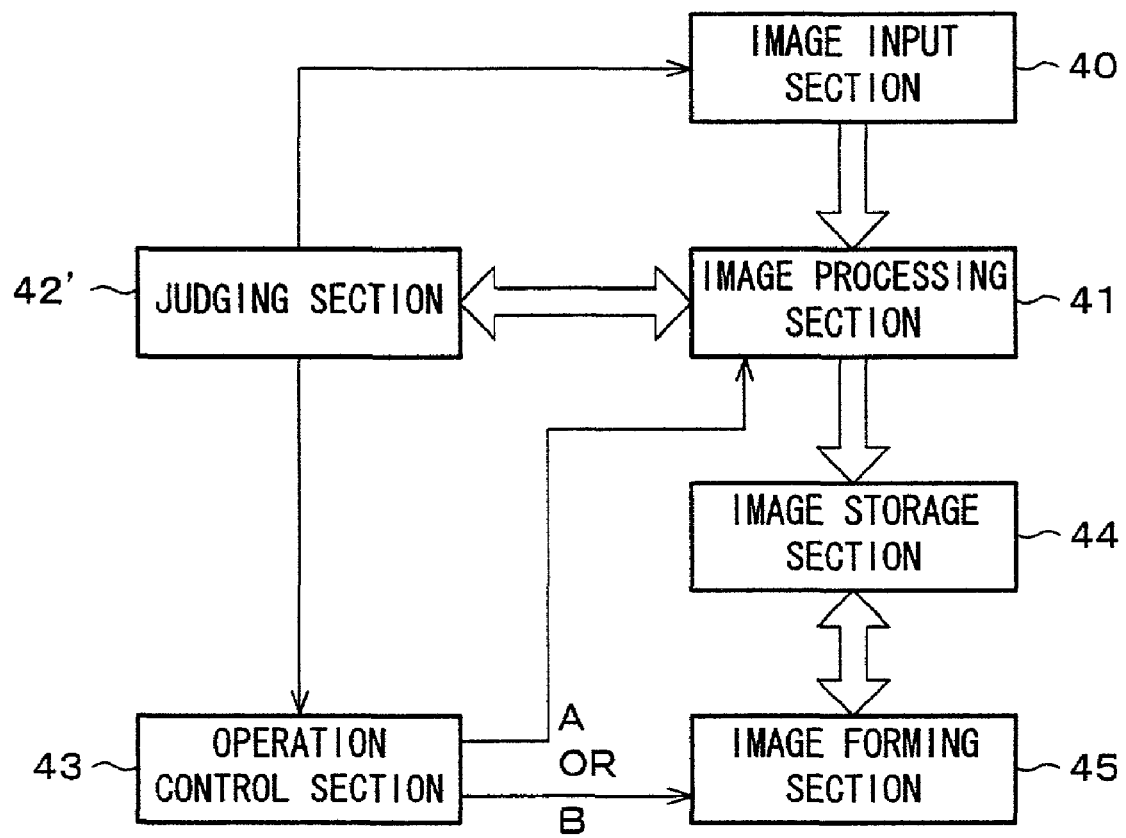

IMAGE FORMING SYSTEM AND IMAGE PROCESSING SYSTEM WHICH RESTRICTS OUTPUT BASED ON JUDGED ATTRIBUTES OF IMAGE DATA

FIELD OF THE INVENTION

The present invention relates to an image forming system which includes an image processing device for processing image data and an image forming device interconnected with each other, and to an image processing system including the image processing device. The invention particularly relates to an image forming system and an image processing system which are connected to a device such as a personal computer via a network.

BACKGROUND OF THE INVENTION

Widely adopted in recent years is an image processing system which with the interconnected devices of at least personal computers and digital complex devices establishes a network so as to allow data communications between these devices on the network. In such an image processing device, image data created on a personal computer and transmitted to a digital complex device on the network can be outputted to a recording medium such as a sheet of paper to obtain a finished record product, or the image data may be transmitted to other image processing devices.

Thus, by establishing a network between the personal computer and the image processing device, it is not required to exchange image data, for example, in the form of a record carrier such as a floppy disk between the image processing device and the personal computer. Further, since the image data can be transmitted or received on the network, image output can be controlled both easily and efficiently, for example, with the use of an intermediate information processing device such as a server.

Meanwhile, a network like this is usually required to meet various demand of users as flexibly as possible. Thus, control methods and control systems of image output used in such a network have been adapted to have a high flexibility. However, even such a network, depending on situations, sometimes requires control methods and control systems with a limited flexibility.

In light of this, there has been proposed, as disclosed in Japanese Unexamined Patent Publication No. 161823/1998 (Tokukaihei 10-161823) (published date: Jun. 19, 1998), a security management system which restricts image output based on whether the image data is security data or not in a common printer device (image forming device) on the network.

Specifically, in this security management system, restriction information such as the number of copies which can be made or available functions which are assigned to the image forming device, or the current status of the image forming device are stored in a database along with corresponding user ID information of each user using the image forming device. The use of the image forming device is either allowed or disallowed by a management device of the network based on the information stored in the database.

Further, Japanese Unexamined Patent Publication No. 157179/1999 (Tokukaihei 11-157179) (published date: Jun. 15, 1999) proposes a system which not only restricts the image forming device but restricts the use of an image forming device according to the content of output or the user, and flexibly changes restrictions.

More specifically, the image forming device in receipt of job data including predetermined processing procedures with the image data from a host computer establishes communications with an externally provided history management device according to this predetermined processing procedures, so as to control image output according to the result of this communication. Here, by changing the content of the predetermined processing procedures, restrictions on image output can be flexibly changed.

Incidentally, when the image forming system is in an environment where it is to be used for private purposes, the image data which the user wants as a finished record product needs to be outputted from the image forming device without any restrictions as he/she desires. However, when the image forming system is in a specific environment where the image data is used for specific purposes according to this environment, the image data does not necessarily reflect what the user wants.

For example, when the network is provided in an office, the image data should only relate to the business operations of this office. Thus, use of the image forming device by the user to output private image data which does not relate to business could violate the contract of employment because the user in this case is using the image forming device which should be used only for business purposes.

Further, use of the company's image forming device for purposes other than business purposes can lead to the problem of increased management cost because it consumes more expendables and increases the frequency of maintenance which is proportional to the frequency of use.

Such a problem becomes particularly prominent with the wide-spreading use of the Internet in these days, whereby the network of the image forming system is interconnected to the Internet via a server to allow users to obtain various ranges of image data from the Internet. Thus, the users can easily obtain image data of personal interests which does not relate to business off the Internet, which fosters private use of the image forming device.

This situation is not just the characteristic of print out of image data in the image forming device, but is also a characteristic of a scanner device which reads out images, and a communication device which sends image data. These devices can also be used to easily process image data of personal needs which does not relate to business, encouraging users to use these devices for private purposes.

Despite these drawbacks, the prior art does not take into consideration suppressing private use of business devices such as the image forming device itself. For example, the technique disclosed in the foregoing Tokukaihei 10-161823 is for security management and the publication is totally silent about structures or control methods for judging private use.

Further, the foregoing Tokukaihei 11-157179 discloses a structure which utilizes job data which includes predetermined processing procedures in addition to the image data. However, while it is theoretically possible to apply such job data for the purpose of suppressing private use of the image forming device, it increases data volume and complicates the control process. Thus, an efficient image forming system cannot be provided with this technique.

That is, the technique disclosed in Tokukaihei 11-157179 relates to an accounting process which works under the principle that image output is restricted, and it still easily allows private use of the image forming device and fails to realize an efficient image forming process in a system which restricts operations of the device.

SUMMARY OF THE INVENTION

An object of the present invention is to provide an image processing system for realizing efficient use of the system by restricting the use of an image forming device and devices (digital complex device, scanner device, etc.) of the image processing system by judging whether these devices are used for intended purposes (whether used privately or not).

In order to achieve this object, a first image forming system of the present invention includes an image processing device for processing image data in a predetermined image process, and an image forming device for forming an image based on the image data processed by the image processing device, the image processing device and the image forming device being connected to each other, and the image forming system comprises: an attributes judging section for judging attributes (characteristics) of the image data; and an output control section for restricting output operation of the image forming device based on the attributes of the image data judged by said attributes judging section.

According to the image forming system, for example, the image data to be used in business is anticipated and its attributes are set in advance, so as to carry out the control of restricting the output of those image data which do not match the attributes. As a result, it is possible to judge those image data which are to be used for private purposes.

The output of the image data for private use as judged by the attributes judging section is restricted by the output control section. Thus, in this image forming system, it is possible to restrict use of the system for the private interest of the user, and efficient use of the image forming system can be realized.

Further, with the foregoing image forming system, image output can be objectively restricted without adding special restriction data to the image data.

Further, a second image forming system of the present invention includes an image processing device for processing image data in a predetermined image process, and an image forming device for forming an image based on the image data processed by the image processing device, the image processing device and the image forming device being connected to each other, and the image forming system comprises: a judging section for judging working environment of the image processing device; and an output control section for restricting output operation of the image forming device based on the working environment judged by said judging section.

With the image forming system, when the judging section judges a working environment of the image processing system, and when the system is in a specific working environment, the output control section restricts output operation of the image data. As a result, image output can be objectively restricted without adding special restriction data to the image data.

Note that, the working environment judged by the judging section is such an environment which could motivate the user to use the image processing system for private purposes. Examples of such include information of time zone or location information of the administrator.

Further, a first image processing system of the present invention includes an image processing device for processing image data in a predetermined image process, and an external device for inputting the image data to the image processing device, the image processing device and the external device being connected to each other, and the image processing system comprises: an attributes judging section for judging attributes of image data which is inputted from the external device; and a control section for restricting image processing operation of the image processing device based on the attributes of the image data judged by said attributes judging section.

According to the image processing system, for example, the image data to be used in business is anticipated and its attributes are set in advance, so as to carry out the control of restricting the output of those image data which do not match the attributes by the attributes judging section. As a result, it is possible to judge those image data which are to be used for private purposes.

The output of the image data for private use as judged by the attributes judging section is restricted by the control section. Thus, in this image processing system, it is possible to restrict use of the system for the private interest of the user, and efficient use of the image processing system can be realized.

Further, with the foregoing image processing system, image processing operation can be objectively restricted without adding special restriction data to the image data.

Further a second image processing system of the present invention includes an image processing device for processing image data in a predetermined image process, and an external device for forming an image based on the image data processed by the image processing device, the image processing device and the external device being connected to each other, and the image processing system comprises: a judging section for judging working environment of the image processing device; and a control section for restricting output operation of the image processing device based on the working environment judged by said judging section.

With the image processing system, when the judging section judges a working environment of the image processing system, and when the system is in a specific working environment, the control section restricts output operation of the image data. As a result, image output can be objectively restricted without adding special restriction data to the image data.

For a fuller understanding of the nature and advantages of the invention, reference should be made to the ensuing detailed description taken in conjunction with the accompanying drawings.

BRIEF DESCRIPTION OF THE DRAWINGS

FIG. 1(a) and FIG. 1(b) are explanatory drawings showing one embodiment of the present invention, in which FIG. 1(a) shows a structure of an image forming system, and FIG. 1(b) shows the image forming system in a network.

FIG. 3 is a list showing one example of how restrictions are imposed on image output according to a print data format of the image data.

FIG. 4 is a list showing one example of how restrictions are imposed on image output according to print data application of the image data.

FIG. 7 is an explanatory drawing showing a display state of the display section according to the embodiment.

FIG. 8 is an explanatory drawing showing a state of displayed message on the display section.

FIG. 9 is an explanatory drawing showing another state of displayed message on the display section.

FIG. 10 is a list of one exemplary history of non-allowable print data to be recorded in a control section.

FIG. 15 is a block diagram showing a schematic structure of the image forming device under network environment adopting the present invention.

DESCRIPTION OF THE EMBODIMENTS

First Embodiment

The following will describe one embodiment of the present invention with reference to attached drawings.

Figure 2:
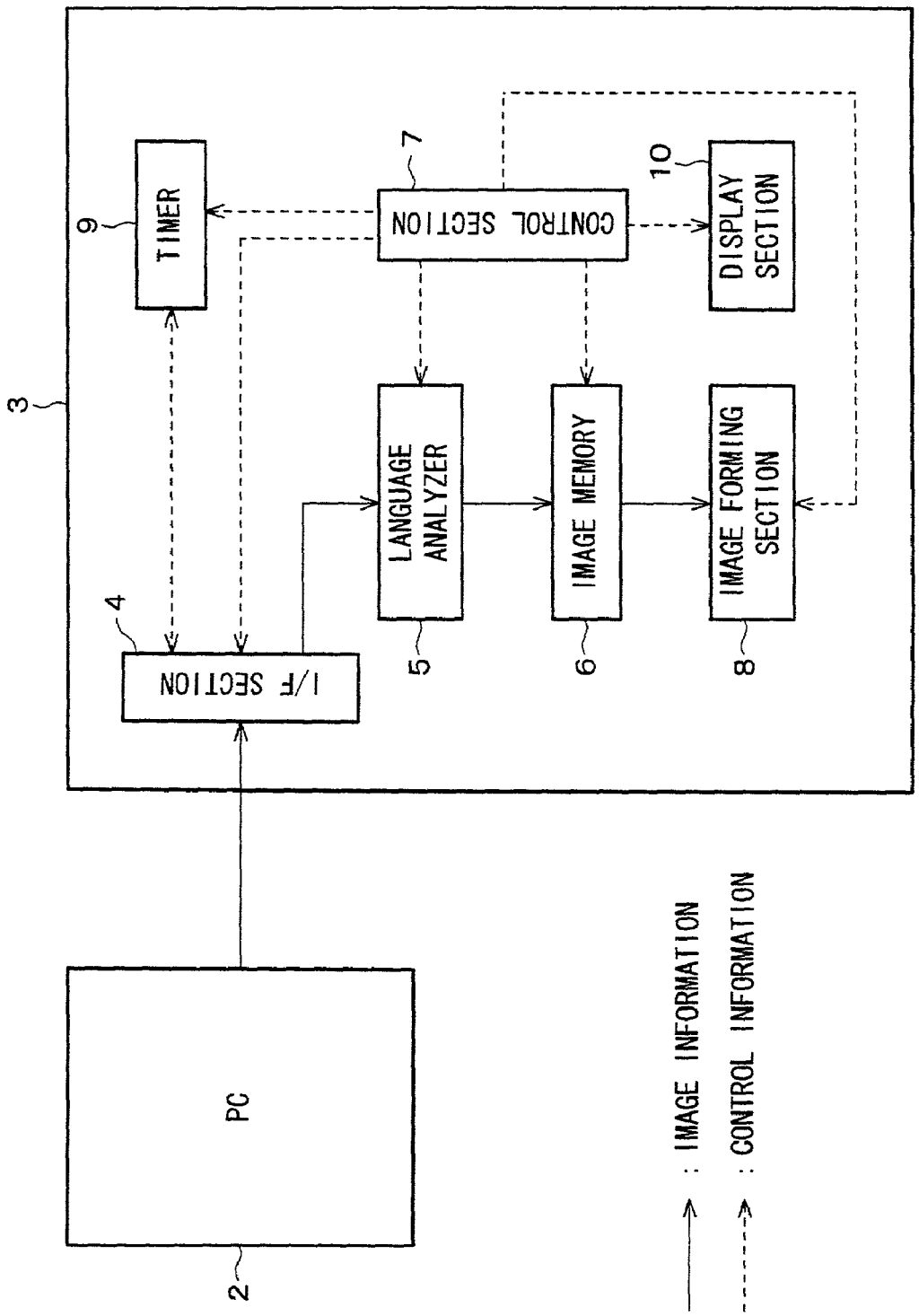
FIG. 2 is a block diagram showing a structure of the image forming system.

FIG. 1(a) is an explanatory drawing showing a structure of an image forming system according to the present embodiment, and FIG. 1(b) is an explanatory drawing showing a structure of the image forming system in a network. FIG. 2 is a block diagram showing a structure of the image forming system.

An image forming system 1 according to the present embodiment includes, as shown in FIG. 1(a), an image forming device 3 for forming an image according to image data, and a personal computer (hereinafter "PC") 2 which is provided as a data processing terminal. In the image forming system 1, image data is sent from the PC 2, via a network, to the image forming device 3, as shown in FIG. 2.

The image forming device 3 is adapted so that image data of a document as read out by a scanner section can be sent to external devices such as the PC 2 or an external facsimile. Further, the image forming device 3 is also adapted so that image data as read out by the scanner section can be sent with e-mail to a predetermined party which is engaged in communication via a public network. That is, the image forming device 3 is provided as a digital complex device of multiple functions, such as a copying function, facsimile function, printer function, and network scanner function, or as a digital image processing device of a single function.

In the image forming device 3, input image data from the PC 2 is inputted in a language analyzer 5 via an I/F section 4. The image data, after being analyzed by the language analyzer 5, is developed in an image memory 6 and temporarily stored therein. The image data stored in the image memory 6 is then outputted to an image forming section 8 according to instructions of a control section 7, and an image based on this image data is formed in the image forming section 8.

The control section 7, using a timer 9, stores the time at which the image data was inputted via the I/F section 4, in addition to controlling display on a display section 10, such as display of an overview of the image data stored and held in the image memory 6, or display of a status of an image being formed in the image forming section 8.

Further, the image forming system 1 is adapted to restrict output of the image data based on an input status of the image data from the PC 2 to the image forming device 3. That is, restrictions on an image output are controlled based on predefined attributes common to the image data, which are set based on the environment in which the image forming system 1 is to be used.

In the present embodiment, the control section 7 includes an attributes defining section which defines in advance common attributes of image data which are allowed to be outputted in the system, and an output control section which carries out the control of allowing or disallowing execution of image output based on the defined attributes (characteristics).

The attributes of image data used to decide whether to allow or disallow output of the image data are not particularly limited. Specific examples include:

(1) attributes indicative of the application software used to run the image data created or processed in the PC 2; and (2) attributes indicative of an input status of the image data created or processed in the PC 2.

More specifically, the following can be suitably used as the attributes of image data which are used to decide whether to allow or disallow output of the image data: data format of the image data ("data format"); a type of application software used to run the image data ("software information"); and a time zone in which the image data was outputted to the image forming device 3 ("time information").

The data format and software information are generated by analyzing the image data in the language analyzer 5. The time information is provided by the time which the timer 9 indicates when the I/F section 4 receives the image data.

The following explains data format of image data more specifically. FIG. 3 is a list showing one example of a restriction imposed on image output according to data format of image data which is outputted for a print job. As shown in FIG. 3, the image data is categorized, for example, based on the size of image area of individual image data, and the type of the image data. Whether to allow or restrict the image forming process (printing) is decided according to the content of these categories.

For example, when the image forming system 1 according to the present invention is provided in a typical office, it is likely that the documents created in this system chiefly contain characters. Further, even when these documents contain color images, majority of the data are character data, and therefore it can be said that image data containing a large volume of color image data are unlikely to be used for business purposes.

Thus, as shown in FIG. 3, black and white data (color area of 0%) designated as Data-1, and data designated as Data-2 and Data-3 with the color areas of not more than 30% and 50%, respectively, are judged to have a high probability of being used for business purposes, and a printing job is allowed.

On the other hand, image data designated as Data-4 with the color area in a range of not less than 50% and not more than 80%, and image data designated as Data-5 with the color area of not less than 80% are judged to contain an excessively large color area and to have a high probability of not being used for business purposes, and a print job is restricted.

Further, data such as the HTML data designated as Data-6 are judged to have a high probability of not being created or used for business purposes, unless the business involves the Internet, and a print job is restricted.

Note that, the categories of image data based on color areas as shown in FIG. 3 are just one example, and, apparently, other categories can be suitably used depending on types of business operations of the office in which the image forming system according to the present invention is employed.

The following explains software information of image data more specifically. FIG. 4 is a list showing one example of a restriction imposed on image output according to print applications. As shown in FIG. 4, the image data is categorized, for example, based on application software used to run the image data. Whether to allow or restrict the image forming process (printing) is decided according to the content of these categories.

For example, when the image forming system 1 according to the present invention is provided in a typical office, it is rare that software running color images is used, and therefore it is highly probable that the image data processed or created by such software are not for business purpose. Further, data using mail software or browser software are rare unless the business involves the Internet. Therefore, it can be said that image data processed or created by software running color images, or by mail software or browser software are very unlikely to be used for business purposes.

Thus, as shown in FIG. 4, a print job is allowed for those software such as word processor software, spread sheet software, and specific graphic software which are designated as Appli-1, Appli-2, and Appli-3, respectively, while a print job is restricted for mail software and browser software designated as Appli-4 and Appli-5, respectively, since they are very unlikely to be used for business purposes. One exception to the software running image data is CAD software designated as Appli-6, since it is likely to be used for business purposes.

Note that, the categories of image data based on types of application software as shown in FIG. 4 are just one example, and, apparently, other categories can be suitably used depending on types of business operations of the office in which the image forming system according to the present invention is employed.

Figure 5:
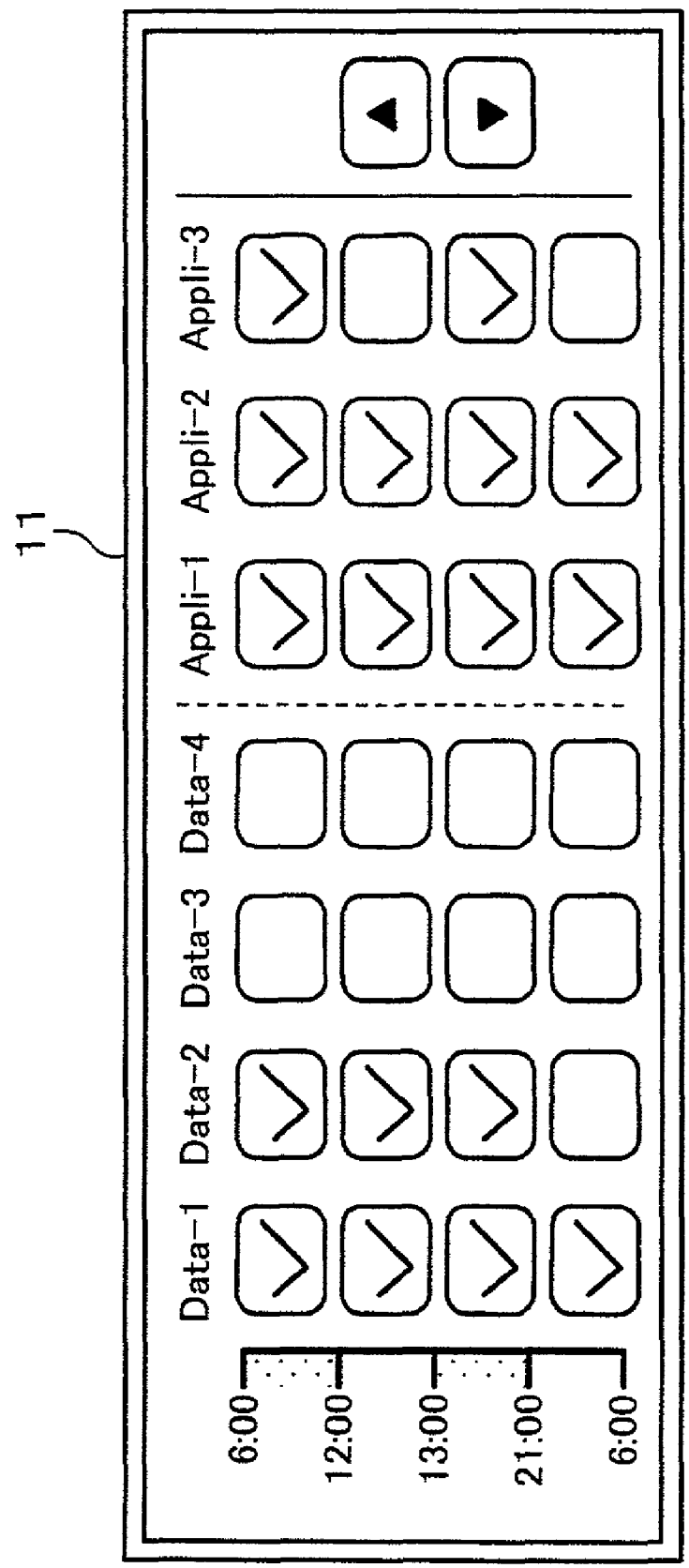
FIG. 5 is an explanatory drawing showing display of application software, categorizing the image data based on time of input, data format, and software information.

The following explains how the time information (information of date and day of the week, etc.) at the time of input of the image data are utilized. FIG. 5 indicates a display section displaying time information of image data and the application software used to run the image data.

As shown in FIG. 5, the image data are categorized based on the time zones in which the image data was run on program 11, and whether to allow or restrict the image forming process (printing) is decided according to the content of these categories.

For example, as shown in FIG. 5, assuming that the vertical axis indicates hours and the horizontal axis indicates data format and software information used to categorize the image data, printing is allowed for the data of small color areas, such as Data-1 and Data-2 as shown in FIG. 3, either all day long or during a specific time period, since these data are likely to be used for business purposes. In the example of FIG. 5, printing is allowed for the image data of Data-2 during a time period of typical business hours, and the print job is restricted only during the night time.

Further, in FIG. 5, the time zones indicated by the check marks indicate that printing is allowed without any restriction. Further, printing is also allowed all day long for the image data of word processor software and spread sheet software as indicated by Appli-1 and Appli-2 in FIG. 4, since these data are likely to be used in normal business operations.

On the other hand, with regard to data having a large proportion of color image such as Data-3 and Data-4 as shown in FIG. 3, a print job is restricted except for some time zones or all day long, since these data may not be used in normal business operations. In FIG. 5, the time zones without check marks indicate that printing is restricted.

Further, with regard to data using graphic software, such as Appli-3 as indicated in FIG. 4, a print job is restricted only during a time zone outside of business hours, since these data are likely to be used for business purposes during normal business hours but can also be used for other purposes in other time zones.

Note that, the way time zones are set on the vertical axis in FIG. 5 is not just limited to the example illustrated in FIG. 5 and it can be set appropriately depending on the environment of the office or types of business operations.

The following describe other criteria for judging whether to impose restrictions on the image forming device, other than the foregoing managing method based on time zones. Note that, the method described below is not to restrict output of image data based on attributes of image data such as data format or application software, but restricts output of image data based on operating environment of the image forming device, i.e., information which does not depend on attributes of image data. Further, it is assumed here that the control section 7 includes a judging section which judges the operating environment of the image forming device, and a control section which controls whether to execute image output based on the operating environment.

For example, whether to impose restrictions or not can be automatically decided depending on such conditions as the presence of those in charge of the image forming device, including an administrator of the network or the office, near the image forming device.

The presence or absence of an administrator according to this method can be confirmed, for example, based on whether the pre-registered terminal (specific information such as the IP address of the terminal used by the administrator) has been recognized via the network, or whether a portable terminal owned by the specific administrator (a terminal storing an ID code specifying the owner, or an ID card) has been confirmed to exist by the image forming device (e.g., whether a signal such as a transmission wave from the portable terminal can be intercepted in a predetermined area around the image forming device).

With the confirmation of presence of a specific administrator by the image forming device, a print job can be instructed to the image forming device without any special restrictions. On the other hand, with absence of a specific administrator, some restrictions are imposed on the print job for the image forming device, for example, by data format, image attributes, and applications).

The image forming device of the present invention is to be used in a network environment and under various conditions, and thus a user is allowed to choose whether to impose restrictions or not on a print job (this is allowed by a mode selection on a known adjuster screen (simulation mode screen; not shown)). By selecting a restriction mode for restricting a print job, some restrictions are imposed on the print job for the image forming device, for example, by data format, image attributes, and applications, whereas the print job for the image forming device is allowed without special restrictions when the restriction mode is not selected.

Figure 6:
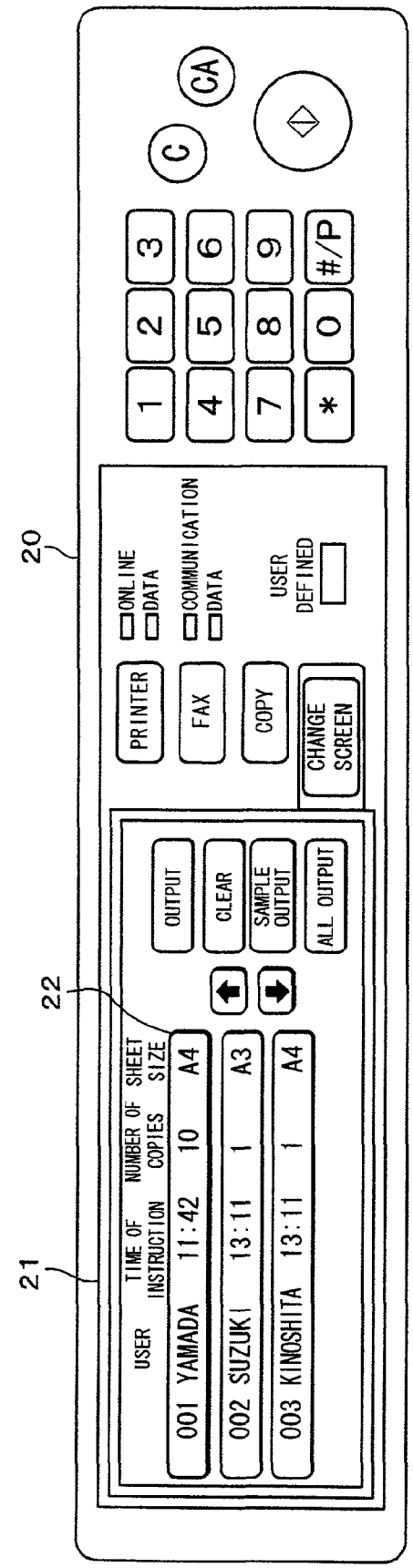
FIG. 6 is an explanatory drawing showing an exemplary structure of a display section which is provided in an image forming device according to one embodiment of the present invention.

The following explains how the use of the image forming device is restricted based on display on the display screen provided on the image forming device. FIG. 6 is an explanatory drawing showing an exemplary arrangement of the display section provided on the image forming device according to the present embodiment.

As shown in FIG. 6, the display section 21 is provided in an operation panel 20, and is adapted to display three print jobs. Each print job displays the name of the user who has instructed the print job, the time the print job was instructed, the number of copies to be printed, and a selected sheet size.

Here, as the display section 21 indicates, three print jobs are scheduled in the image forming device.

To output an image, the operation panel 20 is operated to execute the print job of image data 001 having the highest priority in active display 22. Here, image data 001 is judged by the control section 7 as to whether printing should be restricted based on at least one of data format, software information, and time information. When allowed, the print job is carried out to form an image. On the other hand, when the print job is restricted, a window 23 showing a message which indicates that the data is not allowable is displayed, as shown in FIG. 8.

In FIG. 8, the message "USER 001:YAMADA PRINT DATA NOT ALLOWABLE" is displayed, assuming the user who has sent the image data 001 is named "YAMADA".

In this instance, when the user is printing data which relates to business, the key "OK" is pressed to instruct a print job. If, on the other hand, the data does not relate to business, the user is given the chance to withdraw the print instruction to cancel the image output.

However, simply providing the window 23 displaying the foregoing message is not sufficient because it is still up to the user to execute the print job and the user still can print data which does not relate to business.

Therefore, it is more preferable, as shown in FIG. 9, to provide a window 24 which indicates that the print job will be kept in record when the disallowed print data is printed, in addition to displaying the message which indicates that the print data is not allowable.

In this case, in FIG. 9, the message "USER 001:YAMADA PRINT DATA NOT ALLOWABLE" is displayed as in FIG. 8, together with the message "DATA WILL BE KEPT IN RECORD".

Here, the history of disallowed print data which will be kept in record includes, as shown in FIG. 10, date and time of print, user name, content of detection (various conditions based on which the data were judged to be non-allowable), and the number of copies.

According to this arrangement, in the present embodiment, even when the user carries out the print job of the image data which are restricted and disallowed, the print data will be kept in record, and whether the print job is business-related or not can be easily recognized. This raises the user's public awareness and prevents the image forming device from being used for private purposes. As a result, no unnecessary cost will be incurred for expendables and maintenance.

Further, the restrictions of the print job by the image forming device may be informed to a specific administrator. This enables the administrator to grasp the current condition of the image forming device, and prevents the image forming device from being used for private purposes. As a result, no unnecessary cost will be incurred for expendables and maintenance.

Note that, the specific administrator may be notified of the restricted print job by way of conventional e-mail. That is, a mail address of the administrator, such as that of his/her portable phone, is pre-registered as the specific address for reaching the administrator when restrictions are imposed on the print job, and this mail address is used to notify the administrator of the restricted print job when restrictions are imposed.

Note that, in the present embodiment, the image forming system 1 is realized by directly connecting the PC 2 and the image forming device 3. However, the image forming system according to the present invention is not just limited to this arrangement and it is possible alternatively to construct a network, such as LAN, by connecting a plurality of PCs 2 with at least one image forming device 3 via a server 2*a*, as shown in FIG. 1(*b*). This arrangement is particularly suitable when used in a large office.

Further, in the present embodiment, whether to restrict the image output or not is judged by the control section 7 of the image forming device 3 in the arrangement where the PC 2 and the image forming device 3 are used to make up the image forming system 1. However, the present invention is not just limited to this arrangement and it is possible alternatively to make the judgement by the server 2*a* in the arrangement where the server 2*a* is used to make up the network as shown in FIG. 1(*b*).

Further, in the present embodiment, the display section 21 is provided on the image forming device 3 to display various messages on the window 23 or 24. However, the present invention is not just limited to this arrangement and it is possible alternatively, for example, to display messages on the screen of the PC 2.

Figure 11:
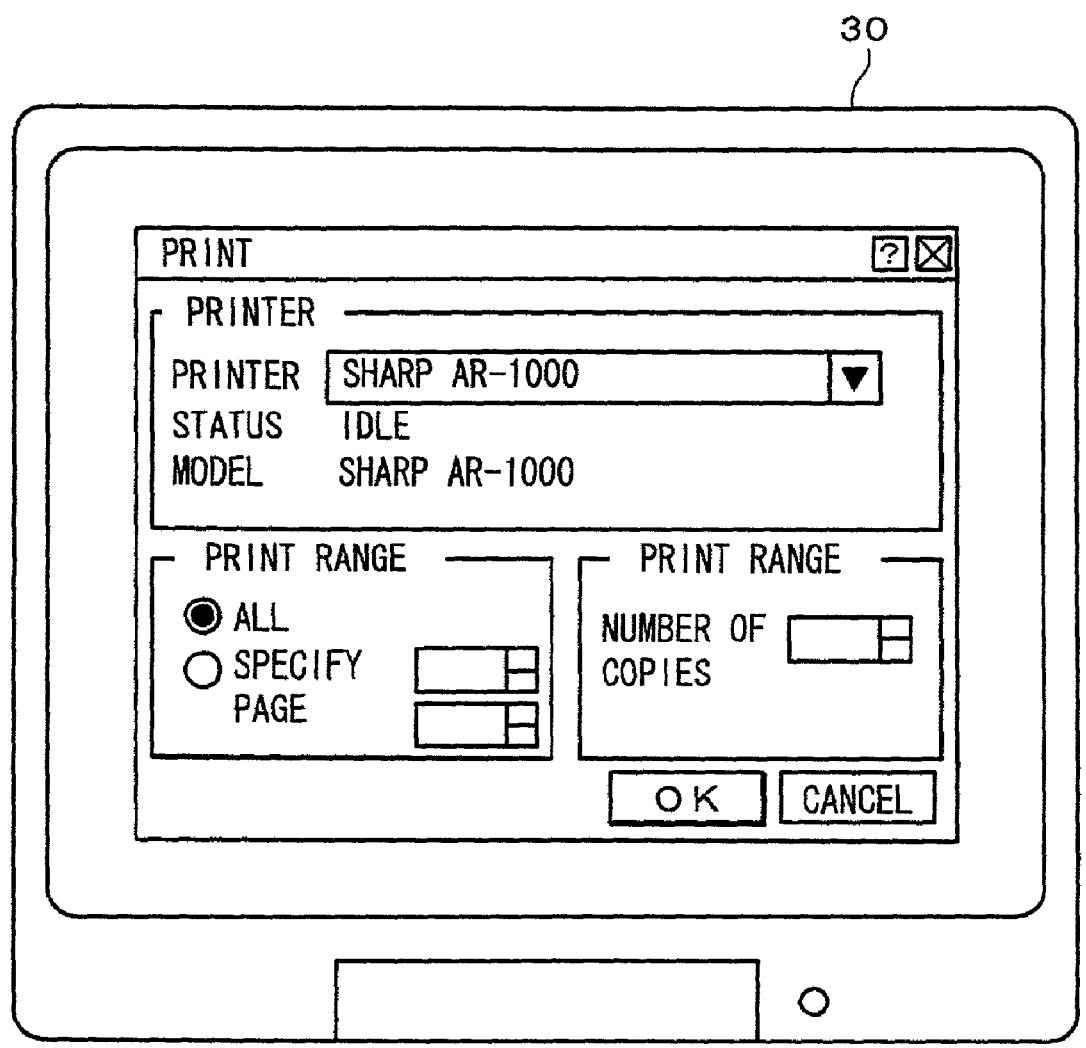
FIG. 11 is an explanatory drawing showing a display state using another application software.
Figure 12:
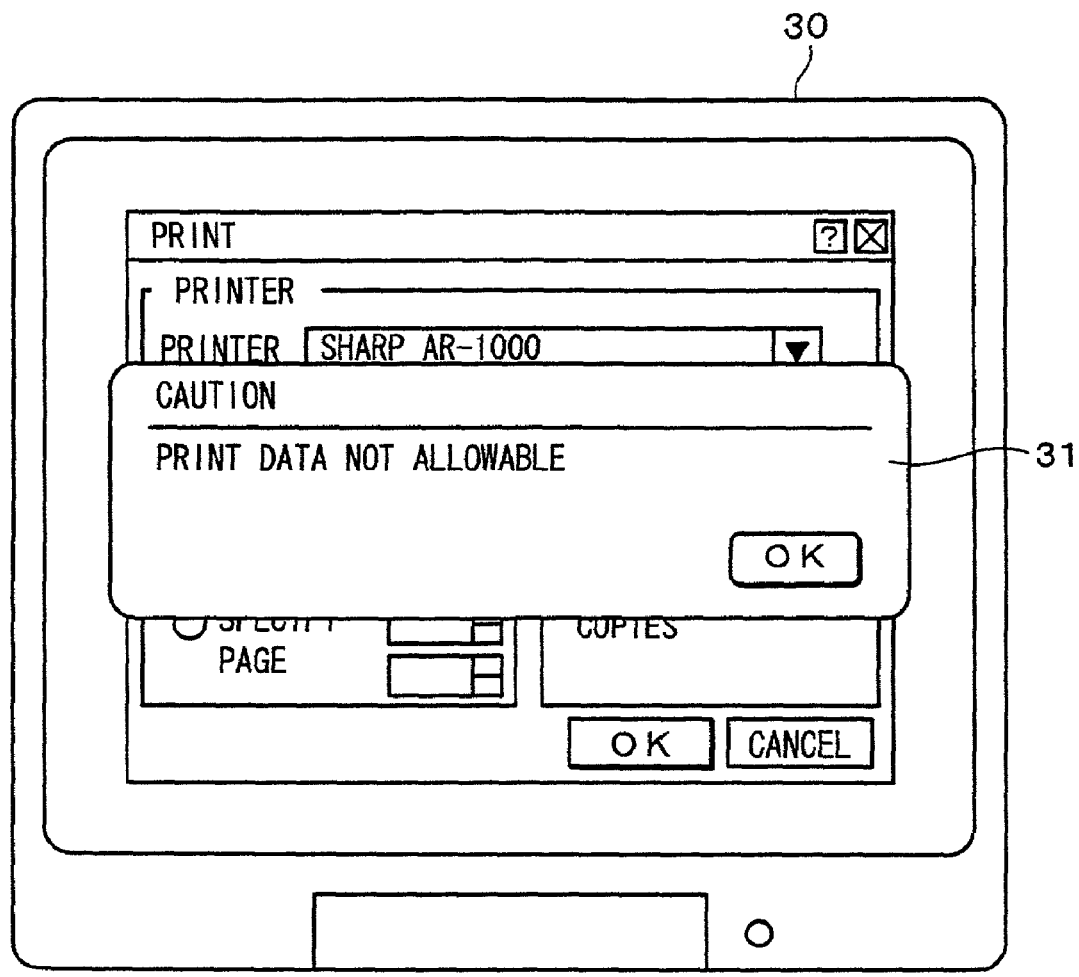
FIG. 12 is an explanatory drawing showing a state of displayed message on the application software.

Further, in the present embodiment, messages which relate to judgement of image output are displayed at the time when the operation of image output is made. However, the present invention is not just limited to this arrangement, and it is possible alternatively, for example, to provide a window 31 which displays the message "PRINT DATA NOT ALLOWABLE" as shown in FIG. 12, when there is a conflict in the conditions of pre-defined print restrictions at the time when the print job is instructed by opening application software 30 of the image data on a PC, as shown in FIG. 11. That is, the way the messages are displayed, or the content of the messages are not limited in the present invention, so long as the messages are displayed with respect to a restricted print job.

Further, in the present embodiment, the operation of image output is performed on the operation panel 20. However, the display section 21 may be provided as a touch panel to include an operating section.

Further, in the present embodiment, the print jobs are scheduled by displaying the schedule number, user name, time of instruction, number of copies, and sheet size as shown in FIG. 6. However, the present invention is not just limited to this arrangement, and various modifications of the displayed content are possible within the scope of the present invention, so long as the image data are recognized.

The following describes a method of restricting the output of a print job by changing the image expression from what is normally adopted in the image forming process of the image forming device.

It is well-known that the image forming device, for example, the image forming section employing the electrophotographic process changes the expression of an output image by controlling the charged potential of a photoreceptor, the quantity of light used to form an electrostatic latent image, a development bias when reproducing the electrostatic latent image into a visible image, and a transfer output from the photoreceptor to a transfer medium. It is also well-known that the expression of a reproduced image can be changed by subjecting the image data to image processing when creating the image data in the print job.

Thus, taking advantage of the predetermined attributes of the reproduced image data from the print job, loyal reproduction or expression of the image can be inhibited by the control of imposing restrictions on the image when it is formed. In the case where the reproduced image data from the print job does not especially require restrictions, reproduction of the image is controlled so that the image is expressed in a normal image quality.

One method of restricting the output in the foregoing system can be carried out specifically in the following manner.

For example, when the image forming device is employing a color image forming process, those image data which were judged to require output restrictions by any of the foregoing judging methods as the restrictions of recording an image in a print job assigned to form a color image can be restricted so that the expression of the color image is restricted by a black-and-white mode or a monochromatic mode, rather than recording the image in a color mode.

Further, it is also possible to impose restrictions on a recording medium on which the image data of the print job is recorded, or on post-process functions such as stapling, punching, folding, and book binding, which are performed on the recording medium having the recorded image. Restrictions may be imposed on the recording medium in this manner, for example, by recording the image on a recording medium of a different size from the image size, or on a recording medium which is made from a different material from that normally used.

It is also possible to restrict the number of pages which can be used to continuously record the image in the image forming section (the number of multiple pages, or the number of pages in a single print job).

With these restriction methods, the public awareness of the user can be improved, and the image forming device can be prevented from being used for private purposes. As a result, no unnecessary cost will be incurred for expendables and maintenance.

Note that, the image forming device as described above is not just limited to the printer employing the electrophotographic process, but is also applicable as a device to a laser printer, a line printer with an LED head, a digital copier, and a digital complex device having combined functions of a facsimile, printer, copier, and scanner.

Further, the present invention is not just limited to the application in the foregoing system with the image forming device to restrict image processes when outputting an image for printing. Thus, the present invention is also applicable to a system which restricts image processes when outputting read-out image data from a scanner to an external device.

Figure 13:
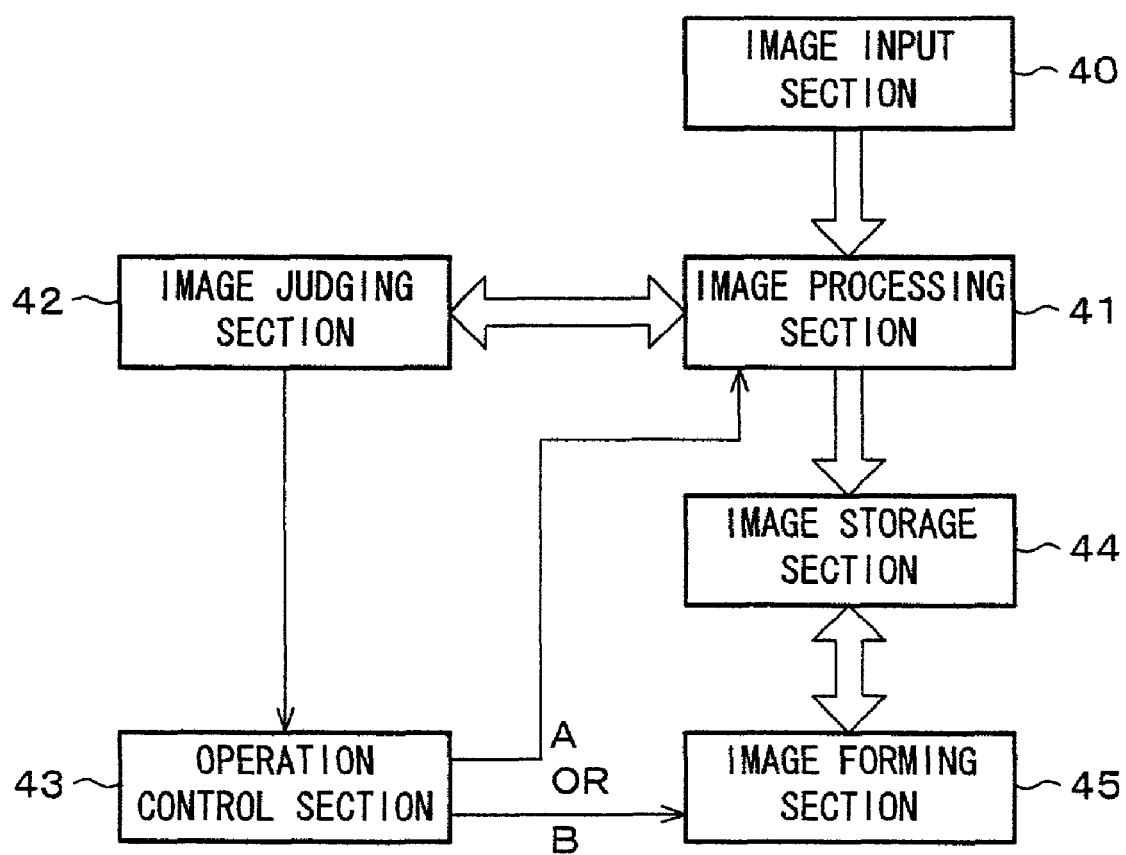
FIG. 13 is a block diagram showing a schematic structure of an image forming device adopting the present invention.

FIG. 13 is a block diagram of an image forming device in which attributes of externally inputted image data from an external device are extracted to impose restrictions on the output according to the result of extraction. The image data from an image input section 40 is processed in a predetermined manner in an image processing section 41. The image data is then sent from the image processing section 41 to an image judging section 42 which judges whether the output of the image data requires restrictions or not. The result of this judgement is then sent to an operation control section 43, which outputs control signal A or B according to the result of judgement. The image data so processed in the image processing section 41 is temporarily stored in an image storage section 44 and later outputted to an image forming section 45.

Control signal A is the signal which is outputted when the output of the image data is restricted at the time of processing the incoming image data to develop it as a record image (preparing a record image). That is, the image processing section 41, in receipt of control signal A, carries out an image process of normal image quality when no restrictions are imposed on the output, and carries out an image process, including the foregoing restriction process for changing the image quality, when imposing restrictions on the output.

Control signal B is the signal which is outputted when switching outputs, whereby the output of the image forming section 45 is allowed when not restricting the output, and is inhibited when restricting the output.

Second Embodiment

The following will describe restrictions imposed on processes in image transmission in an image communication device (e.g., facsimile device, network scanner device, etc.) which transmits image data to a predetermined party in communications.

Criteria for judging whether to impose restrictions on processes of image transmission include: whether the party in communications has been registered; whether the attributes of the image being transmitted are, for example, a color image, black-and-white image, or a mixture of the two images; whether information of time indicating time zones or day of the week is appropriate; and whether or not a specific administrator is present near the device.

Processes of image transmission can be restricted using these criteria by restricting the transmission process of image data to a target party in communications, by restricting transmission of a color image so that it is sent as a black-and-white image, by subjecting the image data being transmitted to image processing to prevent loyal reproduction of this image, or by restricting the number of copies that can be made with respect to the transmitted image.

Figure 14:
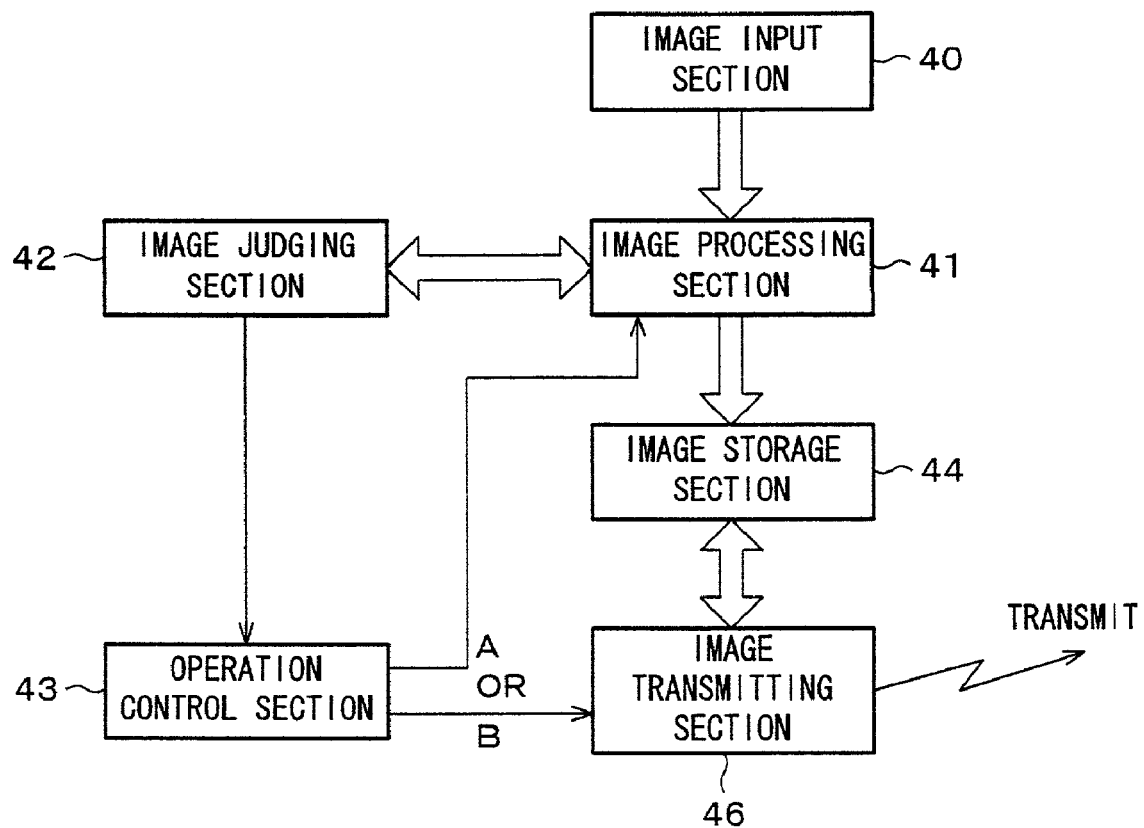
FIG. 14 is a block diagram showing a schematic structure of an image communication device adopting the present invention.

FIG. 14 is a block diagram of an image communication device in which attributes of image data which is transmitted to a predetermined external device are extracted to impose restrictions according to the result of extraction. In the block diagram of FIG. 14, there are provided an image input section 40, an image processing section 41, an image judging section 42, an operation control section 43, and an image storage section 44. The arrangement and operations of these elements are as already described with reference to FIG. 13 and detailed explanation thereof is omitted here. The image data processed in the image processing section 41 is temporarily stored in the image storage section 44 and is outputted to an external device from the image transmitting section 46. Control signal A is the signal which is outputted during preparation of a transmission image in the image processing section 41 when imposing restrictions. That is, the image processing section 41, in receipt of control signal A, carries out an image process of normal image quality when no restrictions are imposed on the output, and carries out an image process, including the foregoing restriction process for changing the image quality, when imposing restrictions on the output.

Control signal B is the signal which is outputted when switching outputs in the image transmitting operation of the image transmitting section 46, whereby the image transmitting section 46 operates to carry out the transmission process when no restrictions are imposed, and the transmission process of the image transmitting section 46 is stopped or the number of copies is limited when imposing restrictions on the output.

Third Embodiment

The following will describe output restrictions on a printer in a network environment.

The network includes a local area network such as a LAN, and a wide network environment such as the Internet. Restrictions of image output on a printer is possible in these environments regardless of the database (server) from which the image data to be outputted for a print job is obtained.

For example, output restrictions may be such that while data originating from a device (terminal) within a local area network are outputted for a print job without any output restrictions, data from an external server, which was obtained using browser software, are outputted by imposing restrictions on image formation of the data. Further, restrictions may be such that image output is restricted when the output is being made from a specific file server during hours outside of assigned time zones.

FIG. 15 is a block diagram of an image forming device in which the external source of image data being inputted is determined to impose restrictions according to the result of this judgement. In the block diagram of FIG. 15, there are provided an image input section 40, an image processing section 41, an operation control section 43, an image storage section 44, and an image forming section 45. The arrangement and operations of these elements are as already described with reference to FIG. 13 and detailed explanation thereof is omitted here.

Note however that a judging section 42', unlike the image judging section 42 of FIG. 13, judges whether to impose restrictions or not based on the originating source of the image data, instead of attributes of the image data. That is, the judging section 42', in receipt of image data from the image processing section 41, sends out a signal for confirming the source (e.g., scanner, Fax, the Internet) of the image data to the image input section 40.

Control signal A is the signal which is outputted when imposing restrictions at the time of processing the incoming image data to develop it as a record image (preparing a record image) in the image processing section 41. That is, the image processing section 41, in receipt of control signal A, carries out an image process of normal image quality with respect to the inputted image data when no restrictions are imposed on the output, and carries out an image process, including the foregoing restriction process for changing the image quality, when imposing restrictions on the output.

Control signal B is the signal which is outputted when switching outputs in the image forming operation of the image forming section 45, whereby the output of the image forming section 45 is allowed when not restricting the output, and is inhibited when restricting the output.

As described, the image forming system and image processing system according to the present invention may have the following arrangements.

A first image forming system of the present invention, which includes an image forming device for forming an image based on image data and an information processing terminal (image processing device), is capable of restricting image output of the image forming device, and comprises attributes setting means for setting common attributes of allowable output image data in advance in the system; and output control means for carrying out the control of allowing or not allowing image output based on the attributes.

According to this arrangement, the image data to be used is anticipated and its attributes are set in advance, so as to carry out the control of restricting a print job for those image data which do not match the attributes. As a result, it is possible to objectively restrict the image output without specially adding restriction data to the image data.

Further, the restrictions do not necessarily forcibly stop the print operation but the user is allowed to ignore the restrictions by his/her decision. Thus, print jobs for private use, which do not relate to business, can be discouraged without interfering image output for business purposes. As a result, private use of the image forming device can be prevented.

Further, in the image forming system, the output control means is preferably control means which controls the image forming device. This allows the judgement to be made on the side of the image forming device, which in turn allows the management of restriction of the image output to be made altogether without requiring each information terminal to set various conditions which are used as criteria for restricting the image output. As a result, it becomes easier to set operations of the entire system.

Further, in the foregoing image forming system, it is preferable that the image forming device and the information terminal are connected to each other via a server to constitute a network, and the server is used as the output control means. This enables the server to make judgement, which in turn allows the management of restriction of the image data to be made altogether without requiring each information terminal to set various conditions which are used as criteria for restricting the image output. As a result, it becomes easier to set operations of the entire system.

Further, it is preferable in the foregoing image forming system that the information terminal is connected to the Internet. This makes it possible to distinguish between those information which relates to business and those used for private purposes in the information of the Internet, thus preventing private use of the image forming device more effectively.

Further, it is preferable in the foregoing image forming system that whether to execute image output or not is judged based on at least one of data format of the image data and application software used to run the image data.

Image data used in business in the image forming system vary according to the type of business operation. Thus, by judging whether to execute the image output based on at least one of data format of the image data and application software used to run the image data, which are the most basic criteria for judging the outlook of the image data, it is possible to judge whether to restrict the print operation or not both easily and clearly.

Further, in the foregoing image forming system it is preferable that whether to execute image output or not is judged according to the time zone of executing the image output. As a result, it is possible to judge whether to restrict the print operation or not both easily and clearly.

Further, it is preferable in the image forming system that at least one of the image forming device and the information processing terminal is provided with display means which indicates that whether to execute the image output or not has been judged with respect to the image data for which image formation is instructed. The display means can be used to display a message for the user to indicate that the print operation is based on the data for which image output is restricted, thus warning the user about the private use of the image forming device.

Further, it is preferable in the foregoing image forming system that the information of image output is managed as history based on the image data which has been judged with respect to whether the image output is allowable or non-allowable, on at least one of the image forming device and the server. This makes it possible to manage the user or job which has executed the image output based on the image data for which output is restricted.

Further, it is preferable in the foregoing image forming system that at least one of the image forming device and the information processing terminal is provided with display means which indicates that the information of image output is managed as history based on the image data which has been judged with respect to whether the image output is allowable or non-allowable. This makes it even more difficult psychologically for the user to use the image forming device for private purposes.

Further, it is preferable in the foregoing image forming system that the information of image output includes at least the user data or job data which has executed the image output.

This makes it possible to manage the use or job that has executed the image output based on the restricted image data.

Further, the image processing system according to the present invention, including an image processing device for processing image data in a predetermined image process, and an external device for inputting the image data to the image processing device, the image processing device and the external device being interconnected to each other, may have an arrangement comprising: judging means for judging working environment of the image processing device; and control means for restricting processing operation of the image processing device based on the working environment judged by the judging means.

In the foregoing image processing system, the image processing device processes the image data in a predetermined image process so as to output the image data for a print job or for transmission. However, in the case where the image processing system is provided in a specific business environment such as an office, use of the image processing system by the user for purposes other than business purposes creates unnecessary cost in the image processing system and the other costs, including the management cost, are increased.

It is therefore preferable in the image processing system provided in a specific working environment that image processes be restricted during private use. However, unlike imposing output restrictions with respect to security data, it is difficult to add restriction data to the image data itself.

With the foregoing arrangement, however, the judging means judges a working environment of the image processing system, and when the system is in a specific working environment, the image processing operation on the image data is restricted by the control means. This enables objectively restricting image output without adding any special restriction data to the image data.

Note that, the working environment judged by the judging means is such an environment which could motivate the user to use the image processing system for private purposes. Examples of such include information of time zone or location information of the administrator.

Further, the image processing system may have an arrangement wherein the judging means judges the information of date and time at which the image processing operation of the image processing device was instructed, and the control means carries out control of restricting the image processing operation of the image processing device.

According to this arrangement, for example, by restricting the image processing operation of a particular time of a particular day outside of business hours, private use of the image processing system, which usually takes place outside of business hours, can be suppressed.

Further, the image processing system may have an arrangement wherein the judging means judges location information of a specific administrator as the working environment when the image processing operation of the image processing device is instructed, and the control means releases the restrictions on the image processing operation of the image processing device when the administrator is judged to be present around the image processing device.

According to this arrangement, restrictions on the image processing operation of the image processing device are released only when the administrator is judged to be present around the image processing device based on the location information of this administrator, and the image processing operation is restricted when the administrator is not present around the image processing system. As a result, private use of the image processing system can be suppressed.

Further, the image processing system may have an arrangement including mode setting means capable of freely setting the output control mode which controls the processing operation of the image processing device by the control means.

According to this arrangement, since the mode setting means can freely set the output control mode, the user can freely decide whether to restrict the image processing operation of the image processing device.

Further, the image processing system may have an arrangement wherein a specific administrator is informed of restrictions on the image processing operation when the control means restricts the image processing operation of the image processing device.

According to this arrangement, a specific administrator is informed of restrictions on the image processing operation when restrictions are imposed on the image processing device. This makes it possible to quickly confirm whether or not the restricted image processing operation is originating from the private use of the image processing system. In addition, the notification to the administrator raises the public awareness of the user and suppresses private use of the system.

Further, in order to achieve the foregoing object, an image processing device of the present invention, which processes image data in a predetermined image process, includes: judging means for judging working environment of the image processing device; and control means for restricting processing operation of the image processing device based on the working environment judged by the judging means.

According to this arrangement, the judging means judges the working environment of the image processing device, and when the image processing device is in a specific working environment, the control means restricts the image processing operation on the image data. This makes it possible to objectively restrict image output without adding any special restriction data to the image data.

Further, the image processing device may have an arrangement wherein the judging means judges information of date and time as the working environment at which the image processing operation of the image processing device was instructed, and the control means restricts the image processing operation of the image processing device at a specific time of a specific day.

According to this arrangement, for example, by restricting the image processing operation of a particular time of a particular day outside of business hours, private use of the image processing system, which usually takes place outside of business hours, can be suppressed.

Further, the image processing device may have an arrangement wherein the judging means location information of a specific administrator as the working environment when the image processing operation of the image processing device is instructed, and the control means releases the restrictions on the image processing operation of the image processing device when the administrator is judged to be present around the image processing device.

According to this arrangement, restrictions on the image processing operation of the image processing device are released only when the administrator is judged to be present around the image processing device based on the location information of this administrator, and the image processing operation is restricted when the administrator is not present around the image processing system. As a result, private use of the image processing device can be suppressed.

Further, in order to achieve the foregoing object, an image forming device of the present invention, which processes image data in a predetermined image process and outputs the processed image data to the image forming means for a print job, includes: judging means for judging working environment of the image forming device; and control means for restricting image forming operation of the image forming means based on the working environment judged by the judging means.

According to this arrangement, the judging means judges the working environment of the image forming device, and when the image forming device is in a specific working environment, the control means restricts the image forming operation on the image data. This makes it possible to objectively restrict image output without adding any special restriction data to the image data.

Further, the image forming device may have an arrangement, wherein the control means restricts the image forming process on a color image when restricting the image forming operation of the image forming means, so that a black-and-white image is outputted from the image forming means.

According to this arrangement, even when the user using the image forming device tries to output private data for a print job, the image data, when it is data of a color image, is outputted by being converted to a black-and-white image. This makes the private use of the image forming device more inconvenient, and thus suppresses private use of the image forming device.

Further, the image forming device may have an arrangement wherein the control means restricts the image forming operation of the image forming means so that an image quality of an image to be formed based on the image data as processed by an image quality adjusting process (various image processing such as density correction, color balance, and image editing) becomes poorer with the restrictions than that without the restrictions.

According to this arrangement, even when the user using the image forming device tries to output private data for a print job, the output image data is processed by the image quality adjusting process to degrade its image quality. This makes the private use of the image forming device more inconvenient, and thus suppresses private use of the image forming device.

Further, the image forming device may have an arrangement wherein the control means restricts the image forming operation of the image forming means so that attributes of a recording medium on which a processed image is formed with the restrictions become different from that without the restrictions.

According to this arrangement, when the user using the image forming device tries to output private data for a print job, the attributes of the recording medium (size, material, etc.) on which the processed image is formed becomes different from that without the restrictions. This makes the private use of the image forming device more inconvenient, and thus suppresses private use of the image forming device.

Further, the image forming device may have an arrangement wherein the control means restricts the image forming operation of the image forming means so that a post-process which is performed on the recording medium on which a processed image is formed is not carried out when the image forming operation is restricted and is carried out when the image forming operation is not carried out.

According to this arrangement, when the user using the image forming device tries to output private data for a print job, the post-process (stapling, punching, folding, etc.) which is carried out with respect to the recording medium on which the processed image is formed, is not carried out. This makes the private use of the image forming device more inconvenient, and thus suppresses private use of the image forming device.

Further, the image forming device may have an arrangement wherein the control means restricts the image forming operation of the image forming means so that the number of copies of a processed image is restricted with the restrictions, whereas the number of copies is not restricted without the restrictions.

According to this arrangement, when the user using the image forming device tries to output private data for a print job, the number of pages (the number of multi-copies) of the processed image is restricted. This makes the private use of the image forming device more inconvenient, and thus suppresses private use of the image forming device.

Further, in order to achieve the foregoing object, an image communication device of the present invention, which processes image data to a predetermined image process and outputs the processed image to an external device, includes: judging means for judging working environment of the image communication device; and control means for restricting the image processing operation based on the working environment judged by the judging means.

According to this arrangement, when the judging means judges working environment of the image communication device and the image communication device is in a specific working environment, the control means restricts the image processing operation on the image data. This makes it possible to objectively restrict image output without adding any special restriction data to the image data.

Further, the image communication device may have an arrangement wherein the working environment judged by the judging means is information of a party to which the image data after the image process is sent, and the control means restricts the image processing operation of the image communication device based on the information of the party to which the image data after the image process is sent.

According to this arrangement, for example, an attempt by the user to send the image data to a specific party (or parties other than a specific party) can be judged to be private use which does not relate to business, thus suppressing private use of the image communication device.

Further, the image communication device may have an arrangement, wherein the control means restricts the image process on a color image when restricting the image processing, so that a black-and-white image is transmitted.

According to this arrangement, even when the user using the image communication device tries to output private data for a print job, the image data, when it is data of a color image, is outputted by being converted to a black-and-white image. This makes the private use of the image communication device more inconvenient, and thus suppresses private use of the image communication device.

Further, the image communication device may have an arrangement wherein the control means restricts the image processing operation so that the number of processed images that can be transmitted is restricted with the restrictions, whereas the number of processed images that can be transmitted is not restricted without the restrictions.

According to this arrangement, when the user using the image communication device tries to transmit private data for a print job, the number of images that can be sent is restricted. This makes the private use of the image communication device more inconvenient, and thus suppresses private use of the image forming device.

Further, the image communication device may have an arrangement wherein the control means restricts the image processing operation so that an image quality of an image to be transmitted as processed by an image quality adjusting process becomes poorer with the restrictions than that without the restrictions.

According to this arrangement, even when the user using the image communication device tries to transmit private data, the output image data is processed by the image quality adjusting process to degrade its image quality. This makes the private use of the image communication device more inconvenient, and thus suppresses private use of the image communication device.

Further, in order to achieve the foregoing object, an image processing device of the present invention, which carries out a predetermined image process on image data which was obtained from a network, includes: judging means for judging working environment of the image processing device; and control means for restricting the image processing operation based on the working environment judged by the judging means.

According to this arrangement, when the judging means judges working environment of the image processing device and the image processing device is in a specific working environment, the control means restricts the image processing operation on the image data. This makes it possible to objectively restrict image output without adding any special restriction data to the image data.

Further, the image processing device may have an arrangement wherein the working environment judged by the judging means is information of a party to which the image data obtained from the network is sent, and the control means restricts the image processing operation of the image processing device based on the information of the party to which the image data obtained from the network is sent.

According to this arrangement, for example, an attempt by the user to send the image data to a specific party (or parties other than a specific party) can be judged to be private use which does not relate to business, thus suppressing private use of the image processing device.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An image forming system which includes an image processing device for processing image data in a predetermined image process, and an image forming device for forming an image based on the image data processed by the image processing device, the image processing device and the image forming device being connected to each other, said image forming system comprising:
an attributes judging section for judging whether or not the image data is for business use based on attributes of the image data including at least a ratio of color area in the image data; and
an output control section for restricting output operation of the image forming device when the judging section judges that the image data is not for business use based on the attributes of the image data judged by said attributes judging section.

2. The image forming system as set forth in claim 1, wherein said output control section is provided in the image forming device.

3. The image forming system as set forth in claim 1, wherein the image forming device and the image processing device are connected to each other via a server to constitute a network, and said output control section is provided in the server.

4. The image forming system as set forth in claim 1, wherein the image processing device is connected to the Internet.

5. The image forming system as set forth in claim 1, wherein said attributes judging section judges attributes of the image data with respect to at least one of data format of the image data and application software used to run the image data.

6. The image forming system as set forth in claim 1, wherein said output control section restricts the output operation differently depending on a time zone in which output of the image data was instructed.

7. The image forming system as set forth in claim 1, comprising a display section for carrying out display indicative of output restrictions imposed on the image data when said output control section restricts output of the image data.

8. The image forming system as set forth in claim 7, comprising:
an input section for enabling a user to make input operation for deciding whether to output the image data being restricted when said output control section restricts output of the image data and said display section carries out the display indicative of output restrictions imposed on the image data,
wherein said output control section releases the output restrictions when said input section instructs output of the image data, so as to output the image data.

9. The image forming system as set forth in claim 8, comprising:
a managing section for storing and managing, as output history, information of the image data which was outputted by being released from the output restrictions when output of the image data was instructed from said input section.

10. The image forming system as set forth in claim 9, wherein:
when said output control section restricts output of the image data and said display section carries out the display indicative of output restrictions of the image data, said display section carries out display, when said input section instructs output of the image data, which indicates that information of the image data to be outputted will be stored and managed in said managing section.

11. The image forming system as set forth in claim 9, wherein management information stored in said managing section includes at least user data or job data which relates to the output image data.

12. An image processing system which includes an image processing device for processing image data in a predetermined image process, and an external device for inputting the image data to the image processing device, the image processing device and the external device being connected to each other, said image processing system comprising:
an attributes judging section for judging whether or not the image data is for business use based on attributes of image data including at least a ratio of color area in the image data which is inputted from the external device; and
a control section for restricting image forming operation of the image processing device when the judging section judges that the image data is not for business use based on the attributes of the image data judged by said attributes judging section.

13. The image processing system as set forth in claim 12, wherein said attributes judging section judges attributes of the image data with respect to at least one of data format of the image data and application software used to run the image data.

14. The image processing system as set forth in claim 12, wherein said control section restricts the image forming operation differently depending on a time zone in which an image process of the image data was instructed.

15. An image forming device which processes image data in a predetermined image process and outputs the image data after the image process to an image forming section for a print job, said image forming device comprising:

an attributes judging section for judging whether or not the image data is for business use based on attributes of the image data including at least a ratio of color area in the image data; and an output control section for restricting output operation of the image forming device when the judging section judges that the image data is not for business use based on the attributes of the image data judged by said attributes judging section.

16. The image forming device as set forth in claim 15, wherein said attributes judging section judges attributes of the image data with respect to at least one of data format of the image data and application software used to run the image data.

17. The image forming device as set forth in claim 15, wherein said output control section restricts the output operation differently depending on a time zone in which output of the image data was instructed.

18. An image processing device for performing a predetermined image process on image data which is inputted from an external device, said image processing device comprising:

an attributes judging section for judging whether or not the image data is for business use based on attributes of the image data inputted from the external device including at least a ratio of color area in the image data; and a control section for restricting image processing operation of the image processing device when the judging section judges that the image data is not for business use based on the attributes of the image data judged by said attributes judging section.

19. The image processing device as set forth in claim 18, wherein said attributes judging section judges attributes of the image data with respect to at least one of data format of the image data and application software used to run the image data.

20. The image processing device as set forth in claim 18, wherein said control section restricts the image processing operation differently depending on a time zone in which image processing of the image data was instructed.

21. An image communication device which performs a predetermined image process on image data, and outputs the image data after the image process to an external device, said image communication device comprising:

an attributes judging section for judging whether or not the image data is for business use based on attributes of the image data including at least a ratio of color area in the image data; and a control section for restricting image processing when the judging section judges that the image data is not for business use based on the attributes of the image data judged by said attributes judging section.

22. The image communication device as set forth in claim 21, wherein said attributes judging section judges attributes of the image data with respect to at least one of the data format of the image data and application software used to run the image data.

23. The image communication device as set forth in claim 21, wherein said control section restricts the image processing operation differently depending on a time zone in which image processing of the image data was instructed.

24. An image processing device which performs a predetermined image process on image data which is obtained via a network, said image processing device comprising:

an attributes judging section for judging whether or not the image data is for business use based on attributes of the image data including at least a ratio of color area in the image data; and a control section for restricting image processing operation when the judging section judges that the image data is not for business use based on the attributes of the image data judged by said attributes judging section.

25. The image processing device as set forth in claim 24, wherein said attributes judging section judges attributes of the image data with respect to at least one of data format of the image data and application software used to run the image data.

26. The image processing device as set forth in claim 24, wherein said control section restricts the image processing operation differently depending on a time zone in which image processing of the image data was instructed.

27. The image forming system of claim 1, wherein the output control section restricts output operation of the image forming device based on at least two of: (a) a time zone in which output of the image data was instructed, (b) an amount of color area in the image data, (c) data format, as opposed to content, of the image data, and (d) the type of software used to run the image data.

28. The image processing system of claim 12, wherein the control section restricts output operation of the image forming device based on one or more of: (a) a time zone in which output of the image data was instructed, (b) an amount of color area in the image data, and (c) the type of software used to run the image data.

* * * * *